United States Patent
Ateya Soliman (10) Patent No.: US 10,099,176 B2
(45) Date of Patent: Oct. 16, 2018

(54) METHODS AND SYSTEMS FOR GAS FILTERING AND CARBON DIOXIDE CAPTURE

(71) Applicant: Roshdy Rady Ateya Soliman, Ottawa (CA)

(72) Inventor: Roshdy Rady Ateya Soliman, Ottawa (CA)

(*) Notice: Subject to any disclaimer, the term of this patent is extended or adjusted under 35 U.S.C. 154(b) by 387 days.

(21) Appl. No.: 14/073,299

(22) Filed: Nov. 6, 2013

(65) Prior Publication Data

US 2014/0186249 A1 Jul. 3, 2014

Related U.S. Application Data

(60) Provisional application No. 61/746,586, filed on Dec. 28, 2012.

(51) Int. Cl.
| | | |
|---|---|---|
| *B01D 53/52* | (2006.01) | |
| *B01D 53/62* | (2006.01) | |
| *B01D 53/50* | (2006.01) | |
| *B01D 53/78* | (2006.01) | |

(52) U.S. Cl.
CPC ............ *B01D 53/62* (2013.01); *B01D 53/504* (2013.01); *B01D 53/78* (2013.01); *B01D 2251/404* (2013.01); *B01D 2251/604* (2013.01); *B01D 2257/504* (2013.01); *Y02A 50/2342* (2018.01); *Y02C 10/04* (2013.01); *Y02C 10/06* (2013.01)

(58) Field of Classification Search
None
See application file for complete search history.

(56) References Cited

U.S. PATENT DOCUMENTS

| | | | | |
|---|---|---|---|---|
| 2003/0033929 A1* | 2/2003 | Pinnau | ................ | B01D 53/228 95/45 |
| 2011/0262328 A1* | 10/2011 | Wijmans | ............. | B01D 53/229 423/210 |

FOREIGN PATENT DOCUMENTS

JP 2009190009 A * 8/2009

OTHER PUBLICATIONS

JP2009190009A_English Translation.*

* cited by examiner

*Primary Examiner* — Anita Nassiri Motlagh
(74) *Attorney, Agent, or Firm* — Rosenberg, Klein & Lee (57) ABSTRACT

Conventionally air filters are particulate filters composed of fibrous materials in order to remove solid particulates such as dust, pollen, mold, and bacteria from the air. Accordingly, it would be beneficial to provide absorbent filters within such systems in order to address the removal of gaseous impurity components from the circulating air in addition to conventional particulate filters. It would be further beneficial to provide such absorbent filters in a manner which is compatible with commercial and residential environments that represent the majority of such air circulation systems. It would be further beneficial to provide such absorbent filters in formats that are compatible with new system installations as well as retrofitting to existing system installations.

12 Claims, 12 Drawing Sheets

METHODS AND SYSTEMS FOR GAS FILTERING AND CARBON DIOXIDE CAPTURE

FIELD OF THE INVENTION

The present invention relates to gas purification and more particularly to liquid based gas purification systems.

BACKGROUND OF THE INVENTION

Currently, the global environment is seriously threatened. It is essential to find a way to reduce carbon dioxide and greenhouse gas emissions. This invention is a solution to address this problem and reduce global warming In chemistry and common usage, a filter is a device that is designed to physically block certain objects or substances while letting others through, depending on their size. Filters are often used to remove solid substances suspended in fluids, for example to remove air pollution, to make water drinkable, and to prepare coffee. Some devices that are called filters may also carry out other processes, such as waste treatment, e.g. a biofilter. Several types of filters are used in chemistry in order to facilitate separation, thereby purifying a liquid or gas. Many filters use gravity, or gravity enhanced by vacuum, i.e. suction, in order to create this separation, often through a funnel-shaped device. Other types of materials may be used to effect separations based on size, similar to filters, such as molecular sieves. The process of passing a mixture through a filter is called filtration. The liquid produced after filtering a suspension of a solid in a liquid is called filtrate, while the solid remaining in the filter is called retentate, residue, or filtrand.

Purification in the chemical context is the physical separation of a chemical substance of interest from foreign or contaminating substances. Amongst the techniques exploited within chemical purification are affinity purification, absorption, filtration, centrifugation, evaporation, extraction, crystallization, adsorption, smelting, refining, distillation, fractionation, electrolysis, and sublimation. Of these absorption describes the removal of a soluble impurity from a feedstream in which a fluid (the absorbate) permeates or is dissolved by a liquid or solid (the absorbent). Adsorption is a surface-based process while absorption involves the whole volume of the material.

Within many environments a variety of impurity gases are present within a circulating, or flow or stream, of gases that are desired. For example, air conditioning systems, heating systems etc whilst primarily designed to move air, primarily nitrogen and oxygen, also move other gases which represent impurities such as carbon dioxide, nitrogen oxide, and sulphur dioxide.

Conventionally air filters are particulate filters composed of fibrous materials in order to remove solid particulates such as dust, pollen, mold, and bacteria from the air. Accordingly, it would be beneficial to provide absorbent filters within such systems in order to address the removal of such impurity components from the circulating air in addition to conventional particulate filters. It would be further beneficial to provide such absorbent filters in a manner which is compatible with commercial and residential environments that represent the majority of such air circulation systems. It would be further beneficial to provide such absorbent filters in formats that are compatible with new system installations as well as retrofitting to existing system installations.

Currently, the desire to alleviate the problem of global warming has resulted in the environmental concern over a reduction of greenhouse gas emissions from industrial sources. The major greenhouse gases contributing to problem are methane ($CH_4$), carbon dioxide ($CO_2$), nitrous oxide ($N_2O$) and halogens such as chlorofluorocarbons (CFCs) and hydrofluorocarbons (HFCs). Among these, $CO_2$ is the primary contributor to the problem due to its abundance, and is thus a major target for reduction. To reduce the excessive $CO_2$ emissions, there is great interest in capturing $CO_2$ within residential and commercial systems but also for utilizing it as a flooding agent for enhanced oil recovery (EOR) in oil sand operations for example. Based on current technologies, the gas absorption with a chemical reaction process using amine is considered to be the most cost effective and has the best proven operability record for $CO_2$. However, the cost of absorption using conventional solvents such as aqueous solutions of monoethanolamine (MEA) is still relatively high. A major reason for the high cost is that the conventional solvents introduce a variety of practical problems including: (i) a high energy consumption for the solvent regeneration; (ii) a high rate of corrosion of the process equipment; (iii) a fast evaporation rate causing high solvent losses; and (iv) a high rate of degradation in the presence of oxygen. All these problems translate into high capital and operating costs. Accordingly, it would be beneficial for these capital and operating costs to be lowered.

A solution of $Ca(OH)_2$, in water, commonly referred to as limewater, is an absorber of carbon dioxide and sulphur dioxide which is in of itself an inert material such that it may be considered for application within a variety of applications, including but not limited to, residential, commercial, vehicle, factories, and agricultural. Limewater may be disposed of through a variety of means including soil neutralization or pH adjustment which is important for agriculture in order to allow plants to absorb from the soil all the elements necessary for growth. As limewater is a solution of $Ca(OH)_2$ this may be applied to land to reduce soil acidity (raise pH) thereby enhancing uptake of important elements for growth whilst lowering uptake of toxic elements such as manganese, copper, and aluminum. Beneficially calcium supports several enzyme systems within plants as well as improving agricultural yields by improving root and leaf growth conditions as well as microbial activity through the presence of $Ca^{++}$ cations. Accordingly, embodiments of the invention provide for a fluid filtering system that is environmentally friendly as the byproduct from the filtering system can be employed within the environment without additional processing, the filtering system itself is reusable.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate drawbacks in the prior art relating to gas purification and more particularly to liquid based gas purification systems.

In accordance with an embodiment of the invention there is provided a device comprising:
an inlet port for receiving a fluid, the inlet port comprising a partition separating the fluid into first and second predetermined portions;
a reservoir comprising a mixture of an absorber and a solvent;

an absorber pipe having at least an opening at one end into the reservoir such that opening is below the surface of the mixture and comprising a permeable membrane to the fluid disposed so as to intercept the first predetermined portion of the fluid;

a director coupled to the partition for receiving the second predetermined portion of the fluid and to the opening of the absorber pipe;

wherein the device has a first state wherein the fluid is not flowing and the level of the mixture within the absorber pipe is at a first predetermined levels and a second state wherein the fluid is flowing and the level of the mixture within the absorber pipe is at a second predetermined level, the second predetermined level being higher than the first predetermined level.

In accordance with an embodiment of the invention there is provided a method comprising:

providing an outer shell comprising an internal divider to form upper and lower chambers;

providing an absorber pipe having openings at each end disposed through the internal divider such that the openings at each end are within the upper and lower chambers;

providing at least a first opening disposed within the upper chamber connecting the upper chamber to a first outer environment;

providing at least a second opening disposed within the lower chamber connecting the lower chamber to a second outer environments;

providing within the lower chamber a mixture of an absorber and a solvent disposed such that the opening of the absorber pipe in the lower chamber is below the surface of the mixture.

In accordance with an embodiment of the invention there is provided a method comprising:

providing an inlet port for receiving a fluid;

providing an chamber coupled to the inlet port for receiving a first fluid;

providing an outlet port coupled to the chamber for receiving a second fluid;

providing an absorber dispenser disposed within the chamber for providing a flow of a mixture across the chamber;

providing a drain for removing the mixture from the chamber; and flowing the mixture such that the second fluid has a lower concentration of a contaminant than the first fluid.

Within another embodiment of the invention there is provided a method comprising:

providing a filter comprising:
   providing a mechanical frame for supporting an absorber;
   providing the absorber; and
wherein the filter when inserted into a fluid system with a fluid flow from a first exterior surface of the filter through the filter and away from a second exterior surface of the filter the filter reduces the concentration of a contaminant within the fluid with the fluid flowing after the filter to the fluid flowing prior to the filter.

Within another embodiment of the invention there is provided a filter comprising an absorber comprising a porous material manufactured from a material selected from the group comprising cellulose wood fiber, a foamed plastic polymer, a low-density polyether, polyvinyl alcohol, a polyester, and a xerogel, wherein the filter is intended to filter at least one of carbon dioxide and sulphur dioxide by soaking the absorber within a solution of calcium carbonate.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to gas purification and more particularly to liquid based gas purification systems.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "fluid" as used herein may refer to, but is not limited to, a flow of gas, liquid, gases, and/or liquids within an environment including but not limited to, a duct, a conduit, a room, a building, a pipe, and an enclosed environment.

An "absorbent" or "absorber" as used herein may refer to, but is not limited to, a material that absorbs by entrapping or chemically reacting with an absorbate wherein the absorbent may be a solid, a liquid, or a gas.

An "absorbate" or "contaminant" as used herein may refer to, but is not limited to, a component of a fluid which is absorbed by an absorbent wherein the absorbate is at least one of a fluid and a solid.

Figure 1:
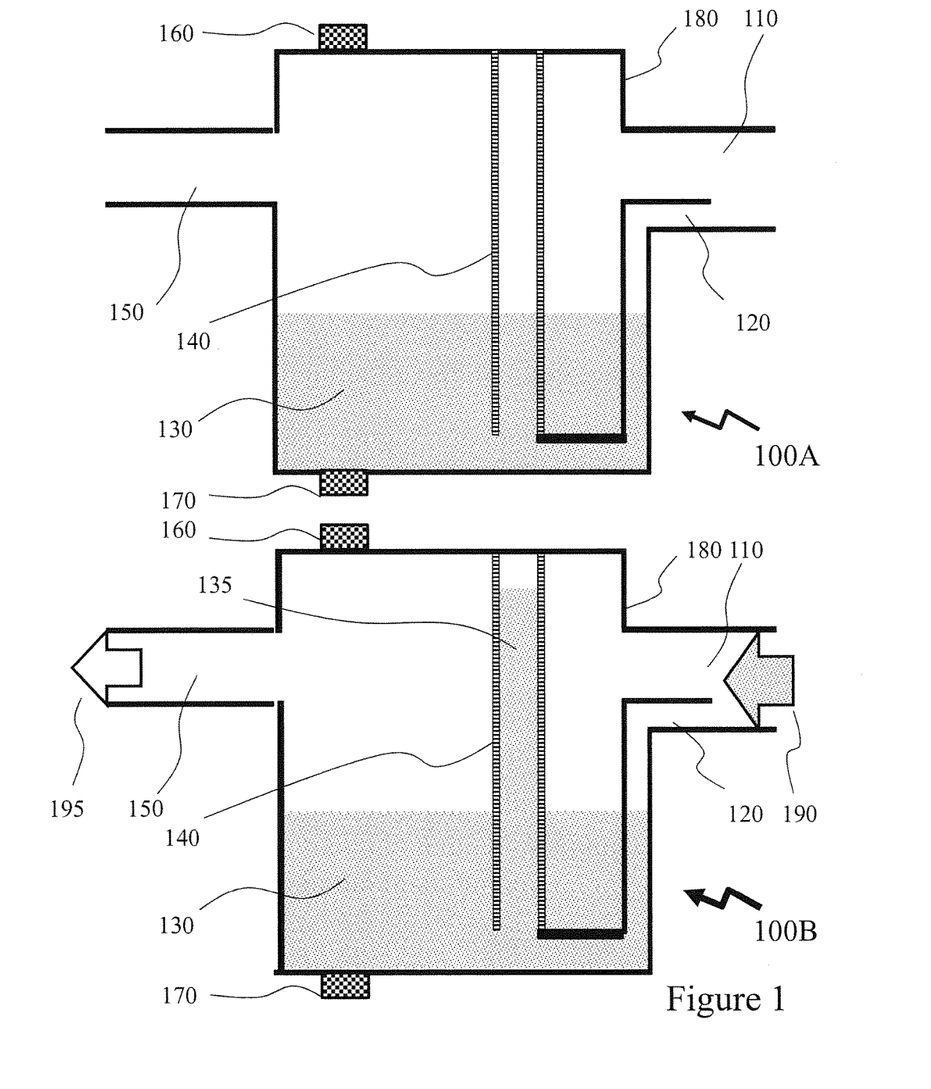
FIG. 1 depicts a fluid absorbent based filter according to an embodiment of the invention.

Referring to FIG. 1 there are depicted no flow and flow configurations 100A and 100E for a liquid absorbent based filter according to an embodiment of the invention. As depicted in no flow configuration 100A a filter 180 comprises an inlet 110 and outlet 150 for receiving flow of a gaseous stream. Within the inlet 110 is a tap-off 120 for diverting a predetermined portion of the gaseous stream within the inlet 110 such that the tap-off 120 terminates at the bottom of a permeable duct 140 within the interior of the filter 180. At the top of the filter 180 an absorber inlet 160 is provided and at the bottom of the filter an absorber outlet 170 is provided. Within the interior of filter 180 a volume of absorber 130 has been provided, e.g. by pouring into the filter 180 via absorber inlet 160.

In flow configuration 100B a gaseous stream 190 is coupled to the filter 180 resulting in a pressure applied to the permeable duct 140 and the absorber 130 via tap-off 120. The pressure via tap-off 120 results in a column 135 of absorber 130 being formed within the permeable duct 140. Accordingly, the gaseous stream 190 coupled to the bottom of the column 135 via tap-off 120 will permeate through the column 135 whilst that portion of gaseous stream 190 within inlet 110 not tapped off is coupled into the chamber within filter 180 wherein due to the pressure created by the gaseous stream 190 it will flow through the permeable duct 140 permeating through column 135, except for that portion of column 135 which may be left unfilled due to design at the target air flow of gaseous stream 190 or variations in air flow. Accordingly, the design may be implemented such that a predetermined portion of the gaseous stream 190 passes through the absorber 130.

For example, absorber 190 may be a saturated solution of calcium hydroxide, $Ca(OH)_2$, in water. At 25° C. $Ca(OH)_2$ is soluble in water at 1.5 $gdm^{-3}$ (14 $mgl^{-1}$) and decreases with increasing temperature and increases with acidity (pH). A calcium hydroxide solution readily absorbs carbon dioxide ($CO_2$) readily from air, giving a milky solution. This is due to the insoluble suspension of calcium carbonate formed by chemical reaction given by Equation (1) below. If excess $CO_2$ is added then a second reaction occurs as given by Equation (2).

$$Ca(OH)_2(aq)+CO_2(g) \rightarrow CaCO_3(s)+H_2O(l) \quad (1)$$

$$CaCO_3(s)+H_2O(l)+CO_2(g) \rightarrow Ca(HCO_3)_2(aq) \quad (2)$$

Additionally, sulphur dioxide ($SO_2$) can be cleaned from exhaust gases using a solution of calcium hydroxide wherein the $SO_2$ is trapped as a precipitate via the chemical reaction given by Equation (3) below.

$$Ca(OH)_2(aq)+SO_2(g) \rightarrow CaSO_3(s)+H_2O(l) \quad (3)$$

Alternatively, a two-stage process for sulphur dioxide ($SO_2$) may be employed wherein initially calcium carbonate reacts with the $SO_2$ to generate calcium sulphate and carbon dioxide, wherein the carbon dioxide is cleaned using the calcium hydroxide solution such as described via Equations (4A) and (4B) below.

$$CaCO_3(s)+SO_2(g) \rightarrow CaSO_3(aq)+CO_2 \quad (4A)$$

$$Ca(OH)_2(aq)+CO_2(g) \rightarrow CaCO_3(s)+H_2O(l) \quad (4B)$$

Accordingly where a saturated solution of calcium hydroxide is employed as absorber 130 both carbon dioxide and sulphur dioxide can be absorbed from gaseous stream 190 resulting in their forming precipitates within the absorber 130 directly as well as through other combinational sequences. The absorber 130 may be added to the filter 180 through absorber inlet 160 and removed via absorber outlet 170. Optionally, depending upon the location of the filter 180 within the air ducts, furnace exhaust or other air system elements absorber inlet 160 and absorber outlet 170 may be coupled via piping/tubing to remote access points and/or be coupled to a system that periodically charges/discharges the filter 180 providing eased maintenance and use.

As noted the solubility of $Ca(OH)_2$ within water increases with acidity as well as reduced temperature. Accordingly, within residential environments the acidity of the solution within which the $Ca(OH)_2$ is dissolved may be increased through the addition of one or more weak acids, such as acetic acid, citric acid, and sorbic acid which may be found within many residential environments already as part of the kitchen cupboard as part of baking accessories. Other acids which may be considered include lactic acid and phosphoric acids, the latter being typically found in domestic rust cleaning compounds. In commercial environments other acids may be considered which are stronger such as hydrochloric where professional trained staff would be responsible for the maintenance of the systems containing the $Ca(OH)_2$ solution and adding acid to such systems.

Figure 2:
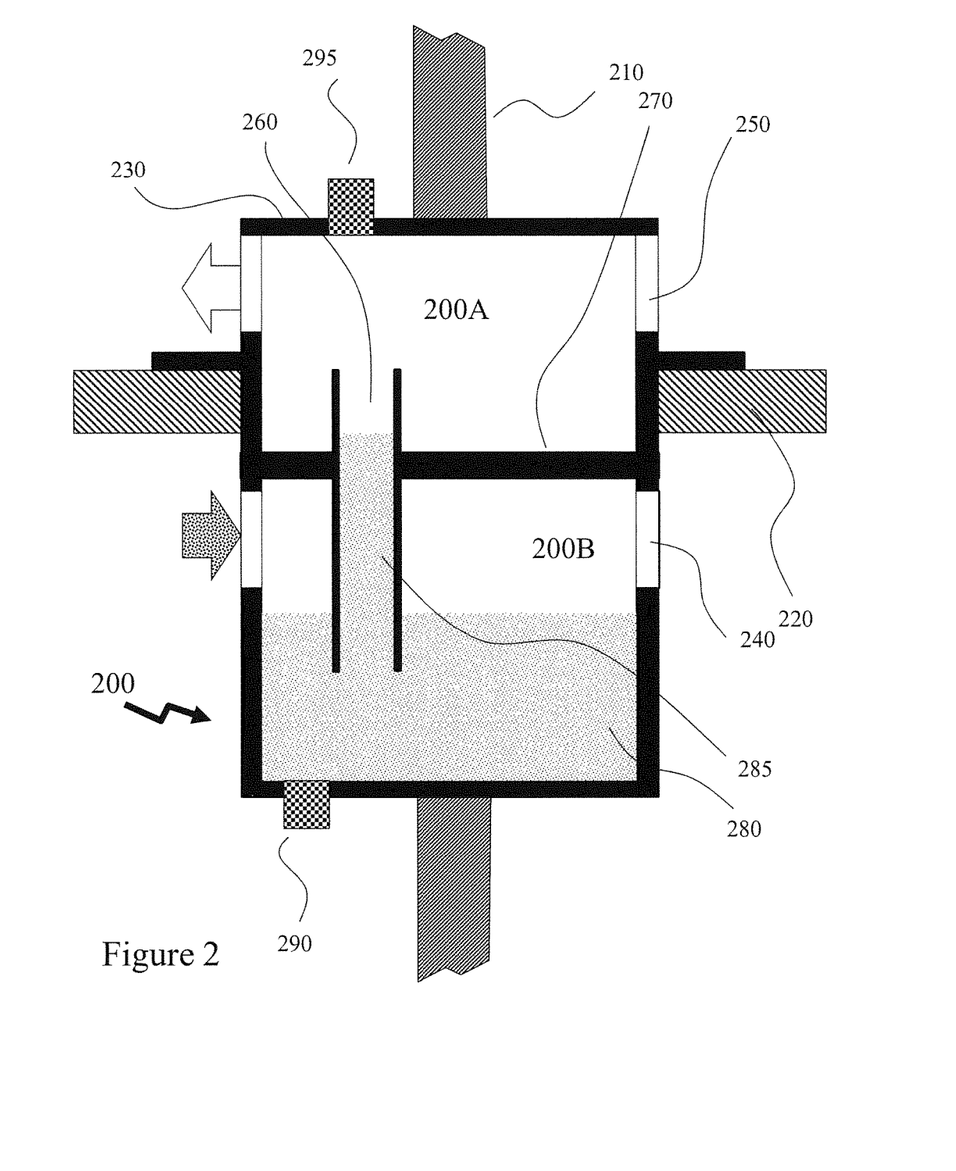
FIG. 2 depicts a fluid absorbent based filter according to an embodiment of the invention.

Now referring to FIG. 2 there is depicted a liquid absorbent based filter 200 according to an embodiment of the invention. As depicted the filter 200 comprises a body 230 with first and second chambers 200A and 200B linked by a tube 260 within inner wall 270. The filter 200 being depicted installed within a wall 210 and a supporting member 220, e.g. a floor. Within the second chamber 200B an absorber 280 is disposed which can be added to the filter 200 via inlet port 295 and drained via outlet port 290. Disposed within the second chamber 200B are first vents 240 whilst disposed within the first chamber 200A are second vents 250. Accordingly, as depicted air flows from first vents 240 into second chamber 200B wherein it passes through the absorber 280 or through the tube 260 which is permeable and absorber column 285 which is raised as a result of the air pressure differential between the second chamber 200B and first chamber 200A. Accordingly, the air then flows into first chamber 200A and out through second vents 250.

It would be evident to one skilled in the art that where absorber 280 is calcium carbonate solution then carbon dioxide and sulphur dioxide within the flowing air may react with the absorber 280 removing them from the air flow. Periodically the absorber 280 may be replaced via inlet 295 and outlet 290. As depicted filter 200 is designed for fitting within a residential or commercial environment between floors but it would be evident that variants of filter 200 may be designed for fitting within an air duct, forced air heating system, or other element of an air distribution system within a commercial or residential environment.

Figure 3:
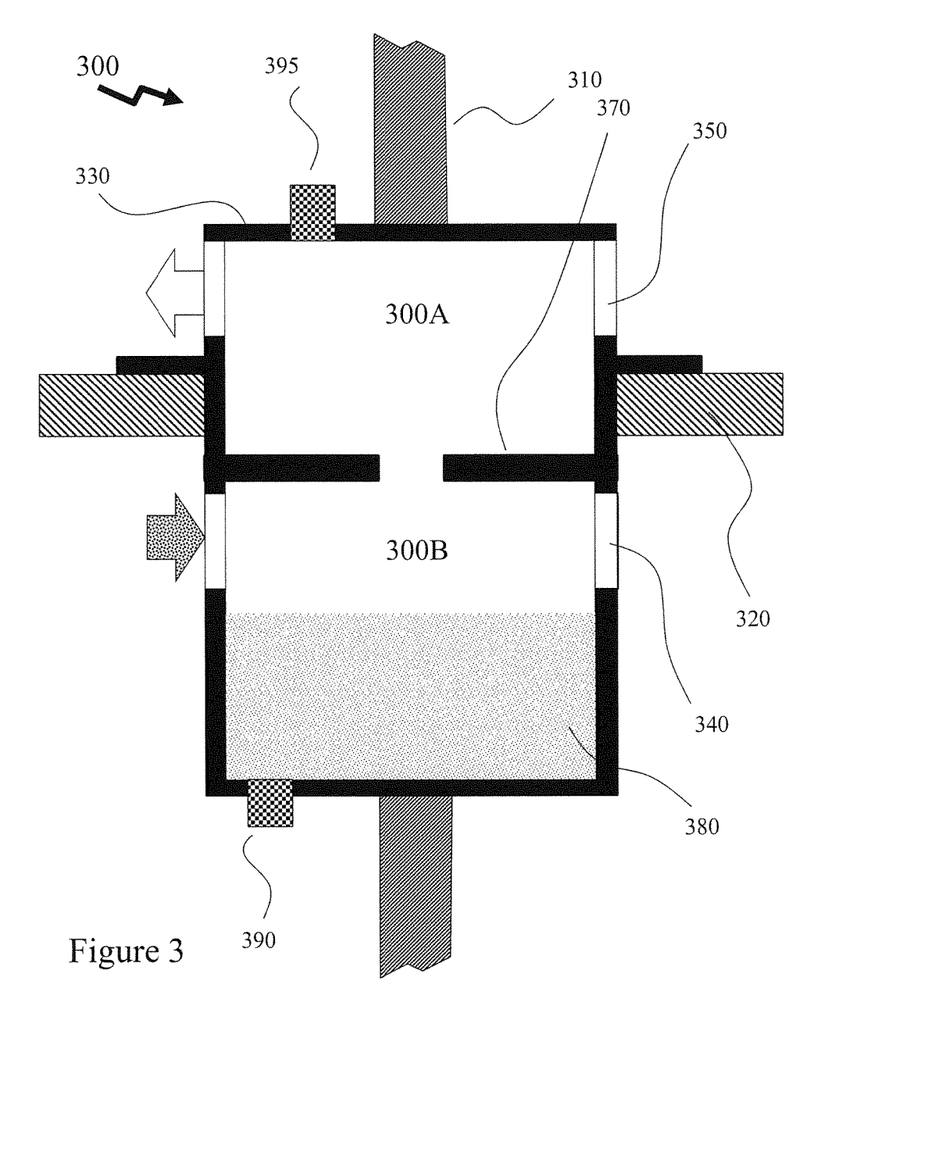
FIG. 3 depicts a fluid absorbent based filter according to an embodiment of the invention.

Now referring to FIG. 3 there is depicted a liquid absorbent based filter 300 according to an embodiment of the invention. As depicted the filter 300 comprises a body 330 with first and second chambers 300A and 300B linked by an opening within inner wall 370. The filter 300 being depicted installed within a wall 310 and a supporting member 320, e.g. a floor. Within the second chamber 300B an absorber 380 is disposed which can be added to the filter 300 via inlet port 395 and drained via outlet port 390. Disposed within the second chamber 300B are first vents 340 whilst disposed within the first chamber 300A are second vents 350. Accordingly, as depicted air flows from first vents 340 into second chamber 300B wherein a portion of the airflow comes into contact with the absorber 380. Accordingly, the air then flows into first chamber 300A and out through second vents 350.

It would be evident to one skilled in the art that where absorber 380 is calcium carbonate solution then carbon dioxide and sulphur dioxide within the flowing air may react with the absorber 380 removing them from the air flow. Periodically the absorber 380 may be replaced via inlet 395 and outlet 390. As depicted filter 300 is designed for fitting within a residential or commercial environment between floors but it would be evident that variants of filter 300 may be designed for fitting within an air duct, forced air heating system, or other element of an air distribution system within a commercial or residential environment.

Figure 4:
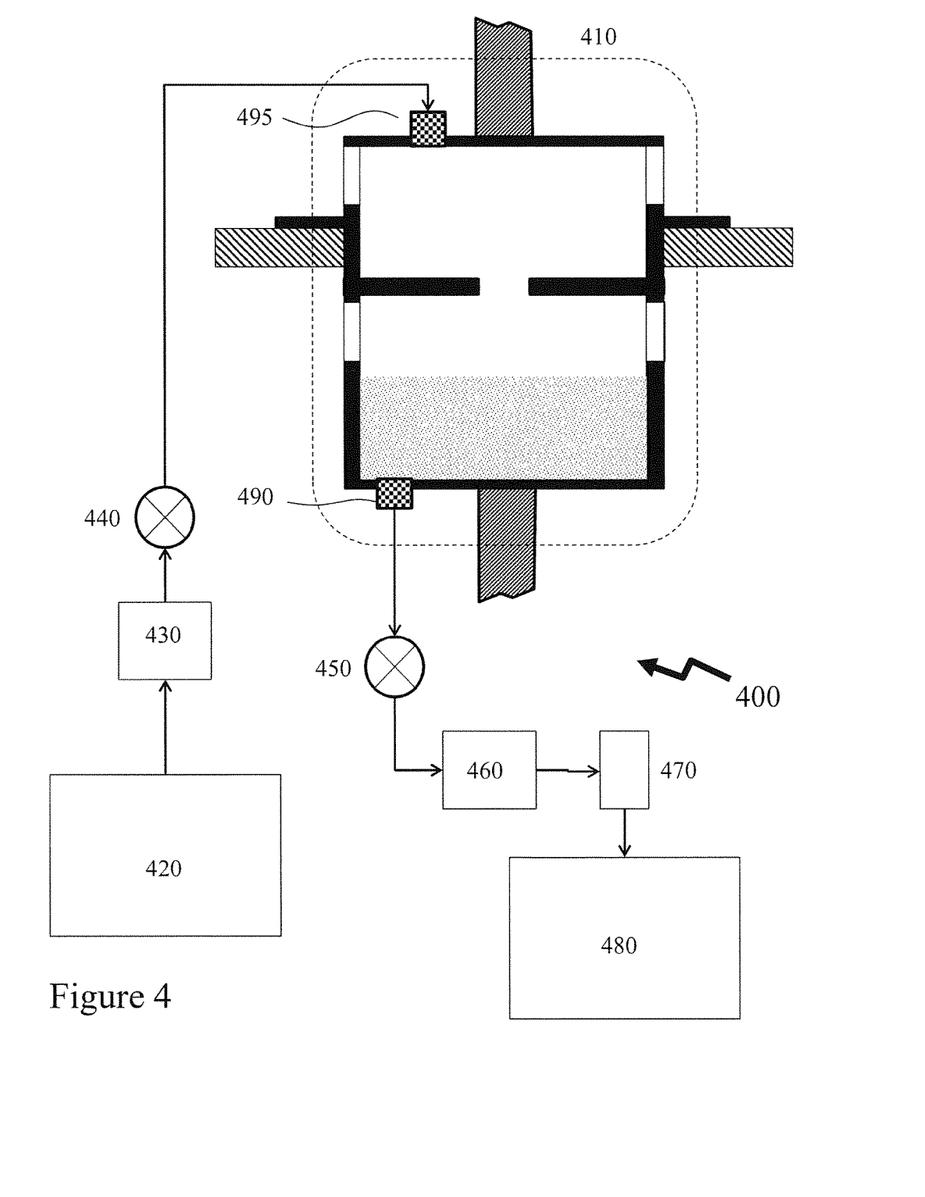
FIG. 4 depicts a fluid absorbent based filter with interconnection to solution reservoir and drain according to an embodiment of the invention.

Now referring to FIG. 4 there is depicted a system 400 wherein a filter 410 such as described above in respect of FIGS. 1 through 3 respectively is coupled at its inlet 495 via first valve 440 and pump 430 to an absorber reservoir 420. The outlet 490 is coupled via second valve 450 to second pump 460 and therein via particulate filter 470 to sink 480. Sink 480 may for example be a reservoir that is periodically drained and disposed of or it may be a drain into a waste system such as that supporting residential and commercial buildings provided by local authorities. Alternatively sink 480 may be combined with particulate filter 470 such that the $CaSO_3$ and/or $CaCO_3$ may fall to the bottom of the combined system as sediment wherein it is removed and the filtered absorber is then drained away. Optionally, sink 480 may be linked back to absorber reservoir 420 to form a closed loop system. In such a loop-back configuration the absorber reservoir 420 may include sensors for monitoring acidity and add additional acid and/or calcium carbonate together with water to maintain the absorber within a predetermined pH range.

Figure 5:
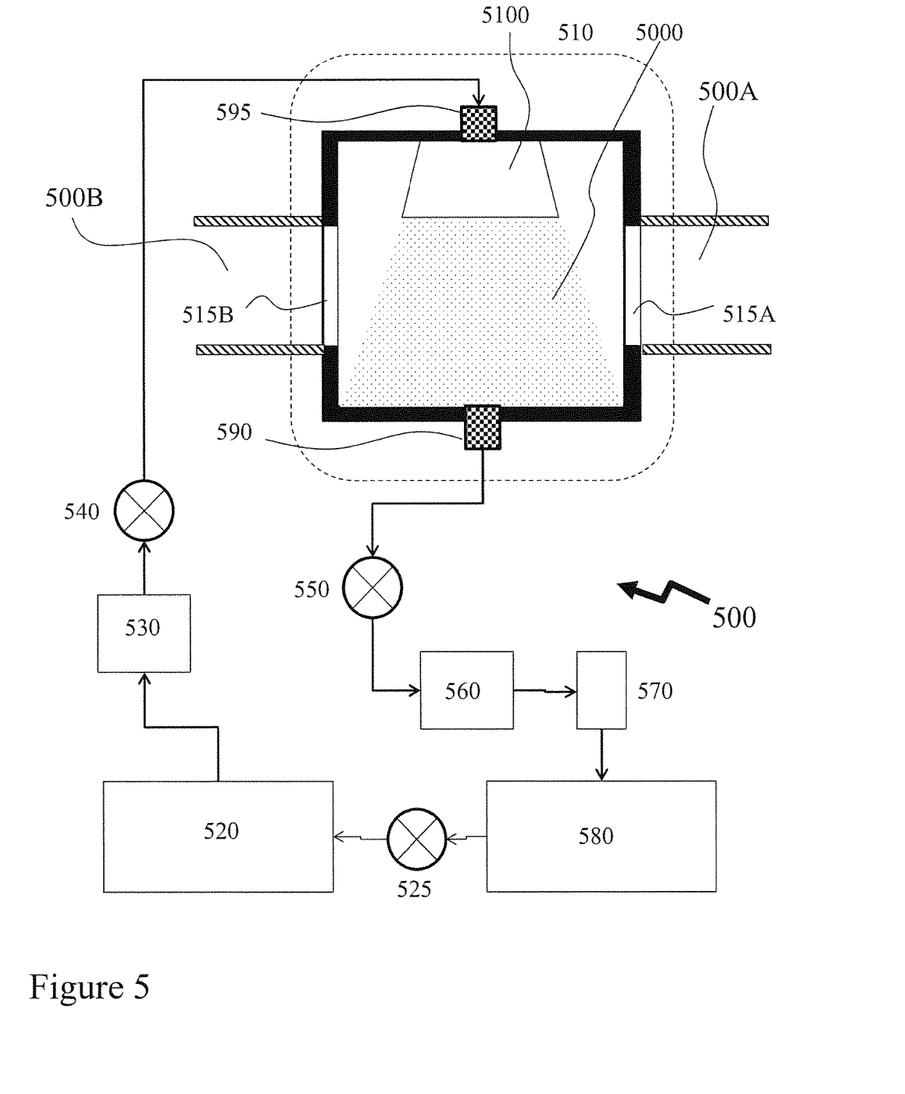
FIG. 5 depicts a fluid absorbent based filter with interconnection to solution reservoir and drain according to an embodiment of the invention.

Now referring to FIG. 5 there is depicted a filter system 500 according to an embodiment of the invention for use within a duct comprising first and second sections 500A and 500B which are coupled to first and second access ports 515A and 515B respectively of the filter 510. The filter 510 is coupled at its inlet 595 via first valve 540 and pump 530 to an absorber reservoir 520. The outlet 590 is coupled via second valve 550 to second pump 560 and therein via particulate filter 570 to sink 580. The sink 580 being coupled back to absorber reservoir 520 via third valve 525 in a closed loop system. Also as depicted inlet 595 of the filter 510 is coupled to shower head 5100 which provides a shower of absorber 5000 within the filter 510 through which the air is flowing.

Figure 6:
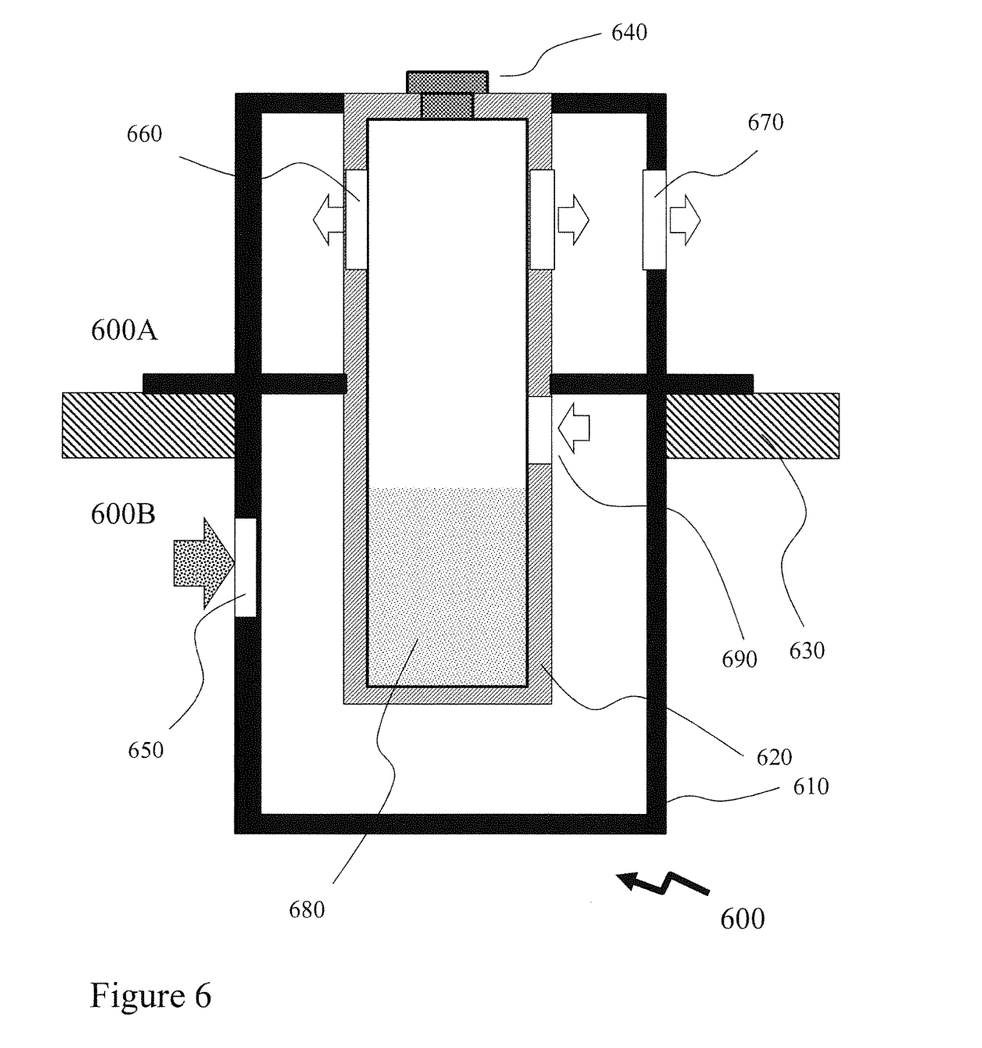
FIG. 6 depicts a fluid absorbent based filter according to an embodiment of the invention.

Now referring to FIG. 6 there is depicted a fluid absorbent based filter 600 according to an embodiment of the invention. As depicted filter 600 comprises an outer body 610 which supports inner body 620 within which there is absorber fluid 680. Filter 600 being supported by building member 630 and having first vent 650 into outer body 610 within lower building environment 600B and a second vent 690 from the outer body 610 to the inner body 620 so that fluid from the lower building environment 600B flows to upper building environment 600A via third vents 660 in the inner body 620 and fourth vents 670 in the outer body 610. The absorber fluid 680 absorbing predetermined components of the fluid flowing from the lower building environment 600B to upper building environment 600A according to the selection of absorber fluid 680.

Figure 7:
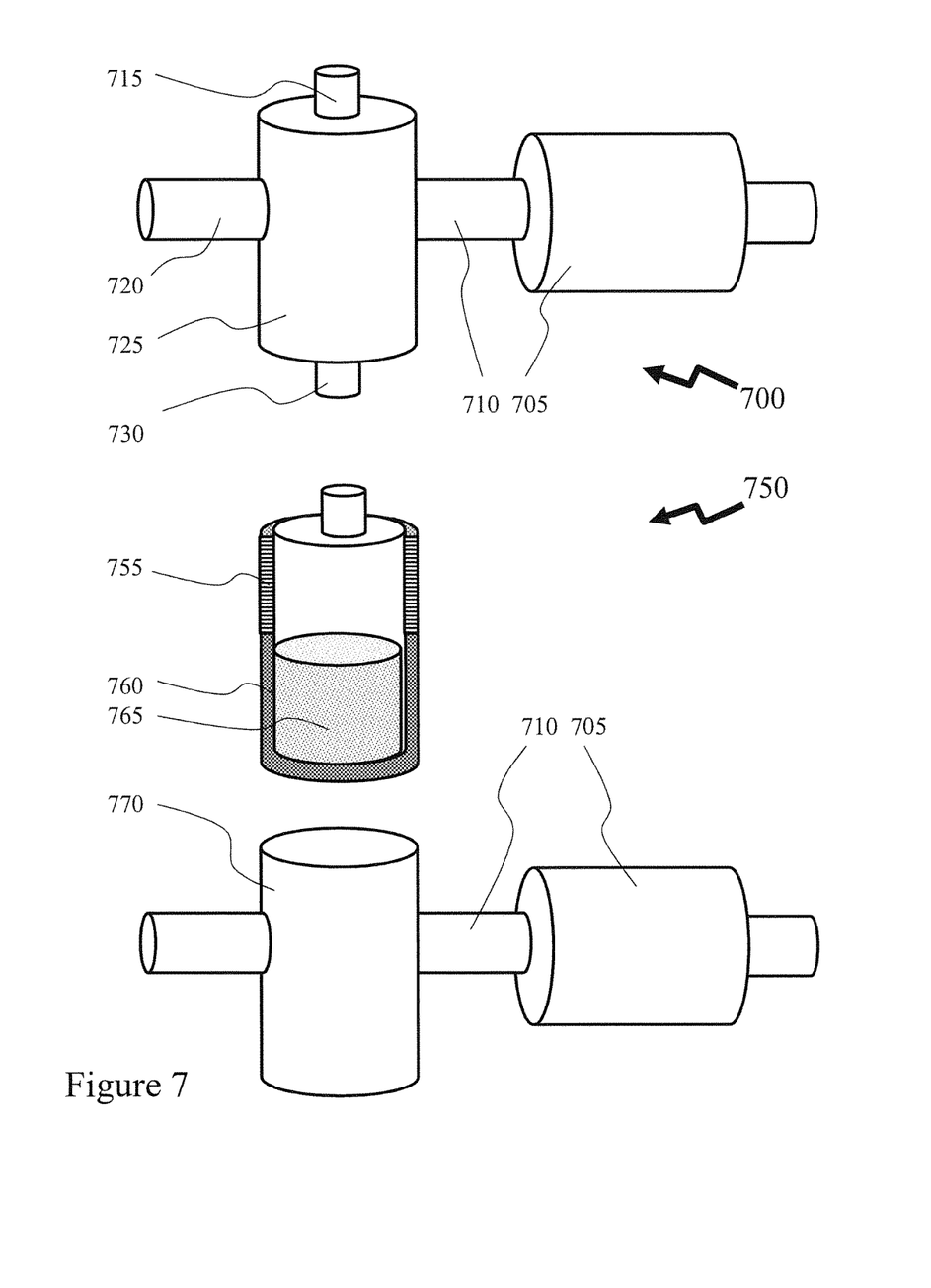
FIG. 7 depicts a fluid absorbent based filter according to an embodiment of the invention.

Referring to FIG. 7 there is depicted a fluid absorbent based filter assembly 700 according to an embodiment of the invention and variant filter 750. Filter 700 comprises a converter 705 disposed within a fluid exhaust 710 wherein the fluid post converter 705 are coupled to a filter 725 before being exhausted through exhaust 720. Disposed at the top and bottom of filter 725 are inlet 715 and outlet 730 wherein absorber fluid may be disposed within the filter 725 via inlet 715 and emptied via outlet 730. Accordingly, the absorber fluid as described in respect of the embodiments of the invention absorbs elements of the fluid flowing within fluid exhaust 710 so that they are reduced in the exhaust 720. Variant filter 750 is similarly disposed after fluid exhaust 710 and fluid post converter 705 but now comprises outer body 770 and cartridge 760 which fits within outer body 770. Cartridge 760 comprises a solid body with permeable membranes 755 that allow fluids flowing within fluid exhaust 710 to flow into and out of the cartridge 760 wherein components of the fluids flowing are absorbed by the absorber fluid 765 within the cartridge 760. Accordingly, it would be evident to one skilled in the art that cartridge 760 may be removed from the outer body 770, emptied, and re-filled with absorber fluid 765. Optionally, cartridge 760 may be cleaned prior to re-filling. According to an embodiment of the invention fluid converter 705 may be a catalytic converter within the exhaust system of a motor vehicle.

Figure 8:
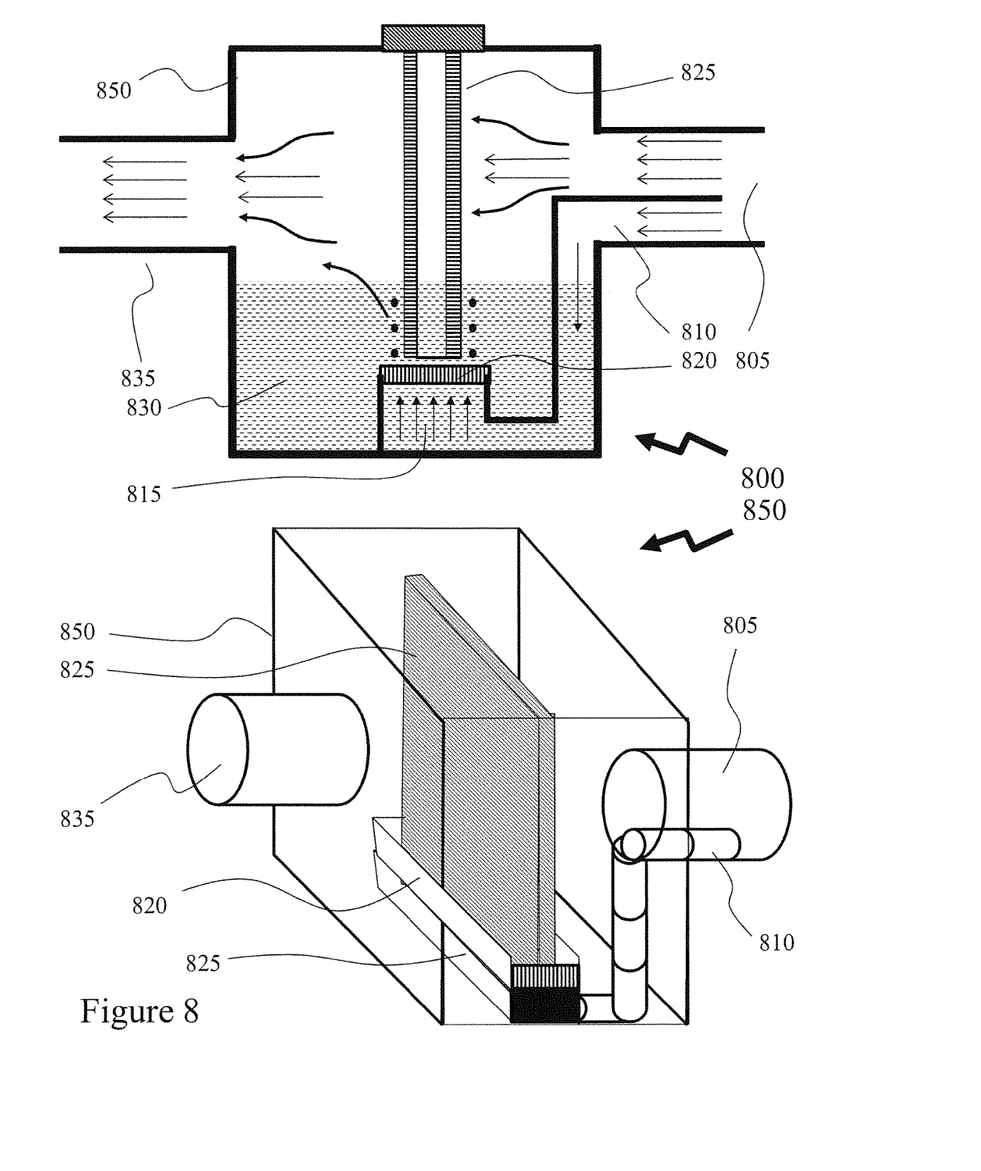
FIG. 8 depicts a fluid absorbent based filter according to an embodiment of the invention.

Now referring to FIG. 8 there is depicted a fluid absorbent based filter according to an embodiment of the invention in cross-section view 800 and perspective view 850. As depicted a fluid flow is present within a fluid conduit 805 wherein a portion 810 is separated from it and channeled to a fluid body 815 wherein it passes through a structure 820. Disposed within the body 850 of the filter a particulate filter 825 filters particulates from the remainder of the fluid flow present within the fluid conduit 805 not redirected visa portion 810. The fluid flow directed by portion 810 to fluid body 815 passes through absorber fluid 830 wherein it combines with the fluid passing through particulate filter 825 into the output duct 835. Accordingly, a portion of the fluid elements present within the fluid flow are absorbed by the absorber fluid such as described supra in respect of other embodiments of the invention. It would be evident to one skilled in the art that a fluid absorbent based filter as described in respect of FIG. 8 may be employed in a variety of systems including an air conditioning system within a semi-closed environment wherein repeated circulation of fluid would result in the fluid passing through the fluid absorbent based filter repeatedly.

Figure 9:
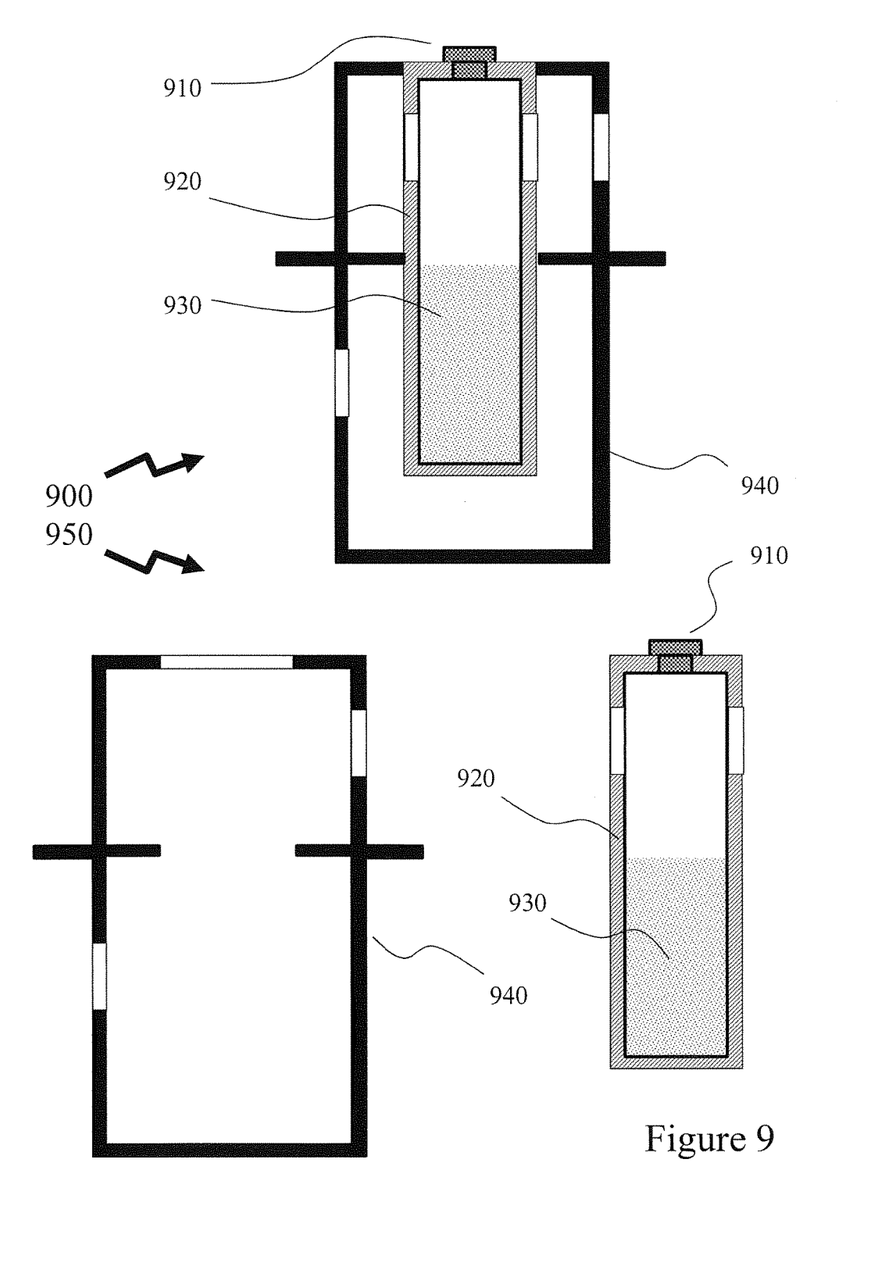
FIG. 9 depicts a fluid absorbent based filter according to an embodiment of the invention.

Referring to FIG. 9 there is depicted a fluid absorbent based filter according to an embodiment of the invention in assembled form 900 and component form 950. The fluid absorbent based filter comprises an outer body 940 and inner cartridge 920 that allows an absorber fluid 930 to be housed within the inner cartridge 920 via port 910. As depicted in component form 950 the inner cartridge 920 may be separated from the outer body 940 allowing the inner cartridge 920 to be emptied of absorber fluid 930 and refilled prior to insertion back into outer body 940. This emptying and refilling being made via port 910.

Within the embodiments of the invention described supra in respect of FIGS. 1 through 9 an absorber fluid is employed to absorb fluid elements from a fluid flow. For example, the absorber may be a saturated solution of calcium hydroxide, $Ca(OH)_2$, in water allowing carbon dioxide and sulphur dioxide to be partially removed from an airflow such as from a furnace or central air heating system for example.

Figure 10:
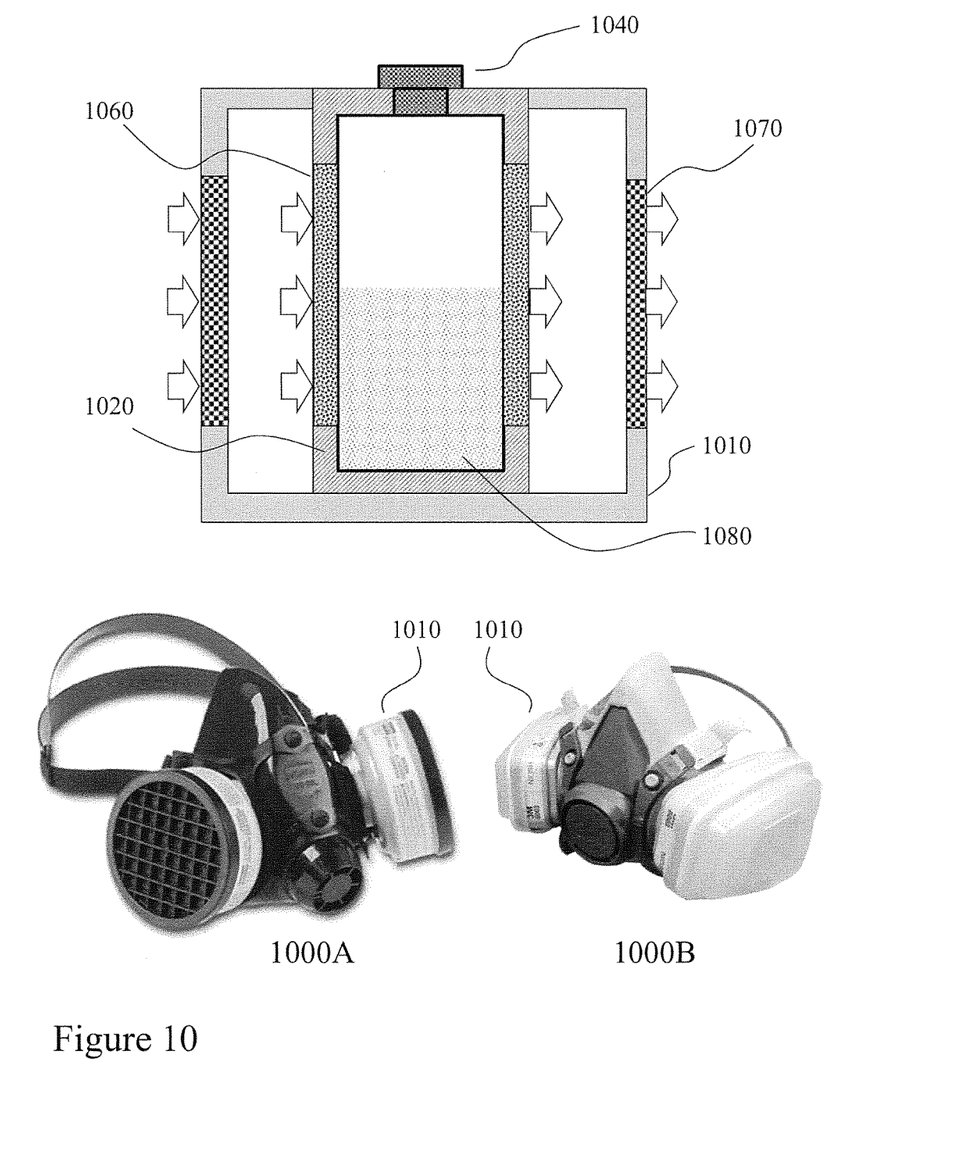
FIG. 10 depicts an absorbent filter according to an embodiment of the invention within safety masks.

Now referring to FIG. 10 there are first and second safety masks 1000A and 1000B respectively according to embodiments of the invention employing fluid absorbent filters 1010. As depicted a fluid absorbent based filter 1010 according to an embodiment of the invention supports inner body 1020 within which there is absorber fluid 1080. Air vents 1070 provide for ingress/egress of air to the filter 1010 such that the air drawn through the filter 1010 then passes through the fluidic barrier membranes 1060 on the inner body 1020 such that the absorber fluid 1080 may absorb predetermined components of the fluid passing through the filter 1010. Fluidic barrier membrane 1060 allows flow of air through but prevents passing of the absorber fluid 1080 such that the first and second safety masks 1000A and 1000B respectively may be transported, shipped, picked up, put down etc.

without the absorber fluid 1080 spilling out from the inner body 1020 or the assembly 1010. Inner body 1020 may be emptied/refilled through cap 1040 alternatively it may be a sealed cartridge for removal/disposal prior to purchase/insertion of another.

Within another embodiment of the invention the inner body 1020 may be a sponge-like material, such as for example those made from cellulose wood fibers, foamed plastic polymers, low-density polyethers, polyvinyl alcohol (PVA, very dense, highly absorbent material with no visible pores and biodegradable), a polyester, or a xerogel. In this instance the assembly 1010 provides mechanical support etc. Accordingly, such absorber based inner bodies 1020 may be soaked in a solution of calcium hydroxide which will then absorb the carbon dioxide forming calcium carbonate. The absorber may then be disposed of or in other embodiments of the invention it may be washed and then "re-loaded" with calcium carbonate solution. It would be evident that such air filters provide a low cost safety mask for individuals in environments with high carbon dioxide levels or potentially high carbon dioxide levels.

Figure 11:
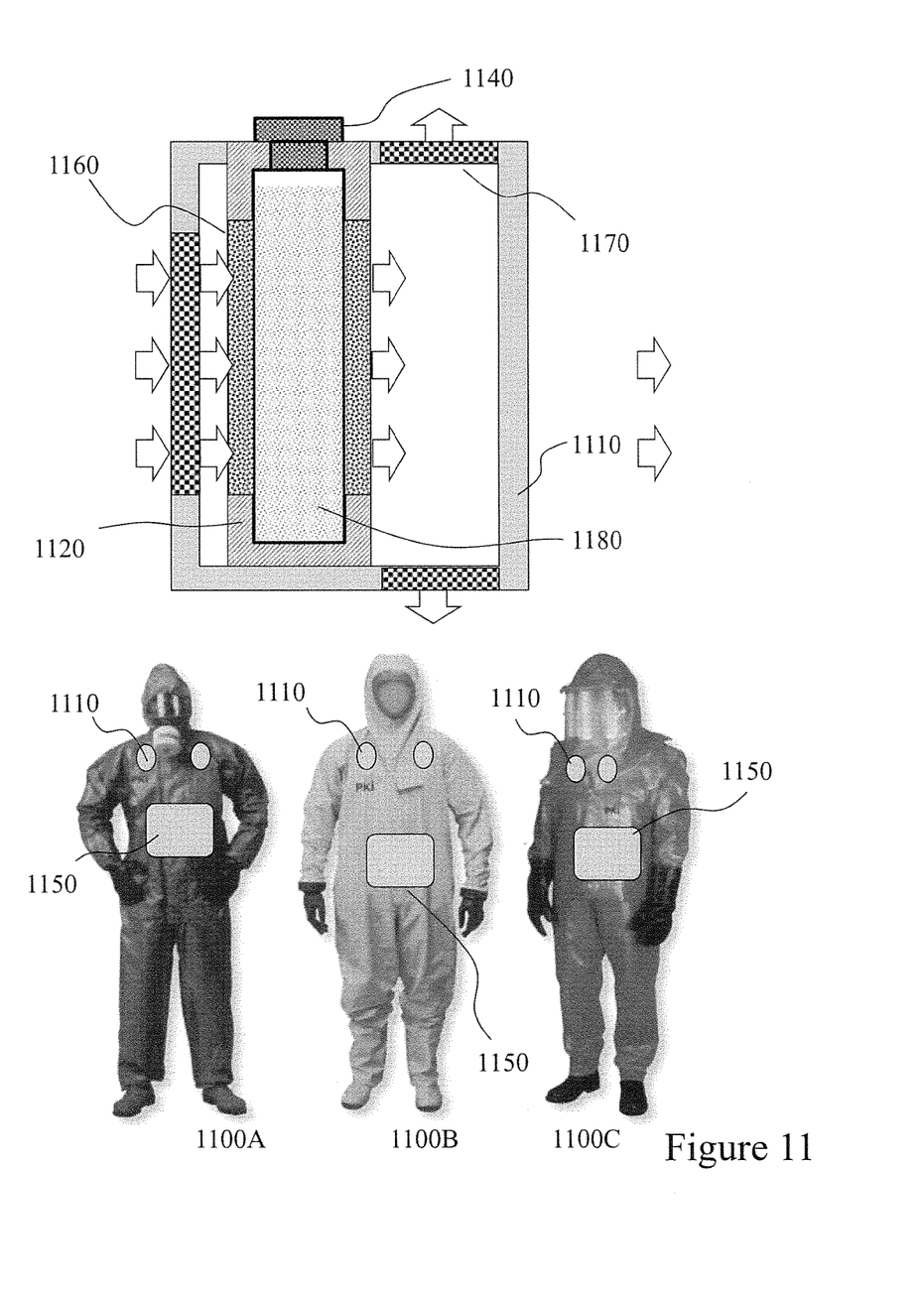
FIG. 11 depicts an absorbent filter according to an embodiment of the invention within safety clothing.

Referring to FIG. 11 there are depicted absorbent filters according to embodiments of the invention employed within safety clothing. As depicted first to third safety uniforms 1100A to 1100C respectively have upon them fluid absorbent filters 1110. As depicted a fluid absorbent based filter 1110 according to an embodiment of the invention supports inner body 1120 within which there is absorber fluid 1180. Air vents 1170 provide for ingress/egress of air to the filter 1010 such that the air drawn through the filter 1110 then passes through the fluidic barrier membranes 1160 on the inner body 1120 such that the absorber fluid 1180 may absorb predetermined components of the fluid passing through the filter 1110. Fluidic barrier membrane 1060 allows flow of air through but prevents passing of the absorber fluid 1180 such that the first to third safety uniforms 1100A to 1100C respectively may be transported, shipped, picked up, put down etc. without the absorber fluid 1180 spilling out from the inner body 1120 or the assembly 1110. Inner body 1120 may be emptied/refilled through cap 1140 alternatively it may be a sealed cartridge for removal/disposal prior to purchase/insertion of another.

Within another embodiment of the invention the inner body 1120 may be a sponge-like material, such as for example those made from cellulose wood fibers, foamed plastic polymers, low-density polyethers, polyvinyl alcohol (PVA, very dense, highly absorbent material with no visible pores and biodegradable), a polyester, or a xerogel. In this instance the assembly 1110 provides mechanical support etc. Accordingly, such absorber based inner bodies 1120 may be soaked in a solution of calcium hydroxide which will then absorb the carbon dioxide forming calcium carbonate. The absorber may then be disposed of or in other embodiments of the invention it may be washed and then "re-loaded" with calcium carbonate solution.

Alternatively those regions 1150 of the first to third safety uniforms 1100A to 1100C may be formed from a flexible inner body 1120 soaked and/or impregnated with absorber fluid 1180. These may solely exterior on the first to third safety uniforms 1100A to 1100C or in other embodiments of the invention may provide breathable areas of the first to third safety uniforms 1100A to 1100C in combination with one or more other barrier materials designed to provide the required chemical, heat, vapour protection for the individual wearing the safety uniform.

Figure 12:
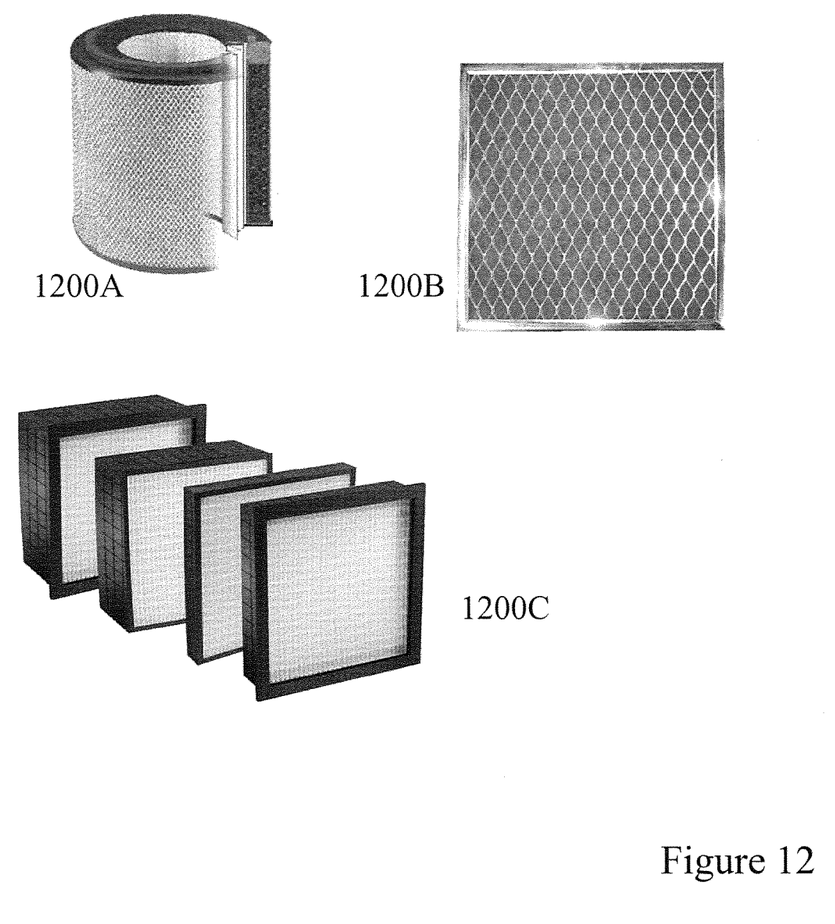
FIG. 12 depicts an absorbent filter according to an embodiment of the invention within air filters.

It would be further evident that the concepts described supra in respect of FIGS. 10 and 11 may also be employed in the formation of air filters either using a combination of a sponge-like materials soaked and/or impregnated with absorber fluid 1180. In such embodiments assembly 1110 provides mechanical support/security as well as in some applications providing the means for inserting/mounting the air filter within an air system such as depicted by first to third air filter assemblies 1200A to 1200C respectively in FIG. 12.

A solution of $Ca(OH)_2$ in water, commonly referred to as limewater, is an absorber of carbon dioxide and sulphur dioxide which is in of itself an inert material such that it may be considered for application within a variety of applications, including but not limited to, residential, commercial, vehicle, factories, and agricultural. Limewater may be disposed of through a variety of means including soil neutralization or pH adjustment which is important for agriculture in order to allow plants to absorb from the soil all the elements necessary for growth. As limewater is a solution of $Ca(OH)_2$ this may be applied to land to reduce soil acidity (raise pH) thereby enhancing uptake of important elements for growth whilst lowering uptake of toxic elements such as manganese, copper, and aluminum. Beneficially calcium supports several enzyme systems within plants as well as improving agricultural yields by improving root and leaf growth conditions as well as microbial activity through the presence of $Ca^{++}$ cations. Accordingly, embodiments of the invention provide for a fluid filtering system that is environmentally friendly as the byproduct from the filtering system can be employed within the environment without additional processing, the filtering system itself is reusable.

It would be evident to one skilled in the art that alternative embodiments of the invention may provide additional fluid elements to the filtering system, such as for example allowing the addition of an air freshener and/or scent to the fluid passing through the system(s). In many environments partial processing of the fluid flowing may be considered rather than all fluid flowing as the system recirculates.

Within the embodiments of the invention it would be evident to one skilled in the art that where a cartridge or removable/insertable element forms part of the overall filter system then preventing the absorber fluid from escaping the removable/insertable element may exploit one or more techniques within the prior art including, but not limited to, non-return valves, spring loaded valves that are opened as inserted into filter body, permeable membranes, moveable valves which open/close during insertion/removal, and twistable valves which open/close during insertion/removal.

It would be evident to one skilled in the art that the methods and devices described above in respect of filtering may be applied to other absorbers and fluids without departing from the scope of the invention.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for filtering a predetermined impurity from a fluid comprising:
   a chamber comprising:
      an inlet port for receiving the fluid which is to be coupled via the chamber to an outlet port, the inlet port comprising a fluid conduit which has a partition physically dividing the fluid conduit into a first predetermined portion coupled to the chamber and a second predetermined portion coupled to a director such that the fluid flowing within the fluid conduit is divided into a first predetermined fluid portion coupled into the chamber and a second predetermined fluid portion coupled to the director;
      the outlet port;
      a reservoir within the chamber to be filled above a predetermined depth with a mixture of an absorber established in dependence upon the predetermined impurity and a solvent;
      an absorber duct disposed within the chamber between the inlet port and outlet port covering a predetermined portion of the chamber between the inlet port and the outlet port and comprising:
         an opening at the bottom of the absorber duct disposed within the reservoir such that the opening is below a predetermined distance from the bottom of the reservoir and is coupled to a distal end of the director from the fluid conduit;
         a permeable membrane forming a predetermined portion of the absorber duct such that the first predetermined fluid portion flows through the permeable membrane, the permeable membrane permeable to the fluid and the predetermined impurity; and
      the director coupled between the second predetermined portion of the fluid conduit and the opening at the bottom of the absorber duct inlet port for directing the second predetermined fluid portion from the fluid conduit to the opening at the bottom of the absorber duct within the reservoir;
   wherein
   when the reservoir is filled with the mixture to at least the predetermined depth and the fluid flows into the inlet port the portion of the absorber duct filled with the mixture increases in dependence upon the fluid flow rate at the inlet port; and
   when the reservoir is filled with the mixture to at least the predetermined depth and the fluid flows into the inlet port the portion of the first predetermined fluid portion flowing through the mixture within the absorber duct increases in dependence upon the fluid flow rate at the inlet port.

2. The system according to claim 1, wherein the absorber within the mixture removes the predetermined impurity from the fluid.

3. The system according to claim 1, wherein the mixture comprises a calcium hydroxide solution; and the predetermined impurity is at least one of carbon dioxide and sulphur dioxide.

4. The system according to claim 1, wherein the absorber duct fills the chamber laterally and vertically above the predetermined depth in the reservoir such that all of the first predetermined fluid portion must flow via the permeable membrane.

5. The system according to claim 1, wherein the first predetermined fluid portion cannot flow from the input port to the output port when the second fluid is filled to the predetermined depth without flowing through the permeable membrane.

6. The system according to claim 1, wherein the mixture is added to the reservoir through a first port on an upper surface of the chamber; and the mixture can be removed from the reservoir through a second port on a lower surface of the chamber.

7. The system according to claim 1, wherein the predetermined depth of the mixture allows an inner portion of the absorber duct to be filled with the mixture to its maximum height at the upper maximum fluid flow rate defined for the chamber.

8. The system according to claim 1, wherein the absorber duct is replaceable.

9. The system according to claim 1, wherein the inlet port and outlet port are coupled to a fluidic circuit.

10. The system according to claim 1, wherein the mixture is circulated into and from the reservoir by an external fluidic circuit.

11. The system according to claim 1, wherein the permeable membrane is a particulate filter.

12. The system according to claim 1, wherein the permeable membrane is not permeable to the mixture.

* * * * *